US007339956B2

(12) United States Patent
Rabenko et al.

(10) Patent No.: US 7,339,956 B2
(45) Date of Patent: *Mar. 4, 2008

(54) SYSTEM AND METHOD FOR THE SYNCHRONIZATION AND DISTRIBUTION OF TELEPHONY TIMING INFORMATION IN A CABLE MODEM NETWORK

(75) Inventors: Theodore F. Rabenko, Duluth, GA (US); Lisa V. Denney, Woodstock, GA (US)

(73) Assignee: Broadcom Corporation, Irvine, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 10/967,852

(22) Filed: Oct. 18, 2004

(65) Prior Publication Data

US 2005/0053098 A1    Mar. 10, 2005

Related U.S. Application Data

(63) Continuation of application No. 09/656,459, filed on Sep. 6, 2000, now Pat. No. 6,819,682.

(60) Provisional application No. 60/152,254, filed on Sep. 3, 1999.

(51) Int. Cl.
*H04J 3/06* (2006.01)

(52) U.S. Cl. .............. 370/503; 370/401; 370/352; 725/111; 725/114

(58) Field of Classification Search .......... None
See application file for complete search history.

(56) References Cited

U.S. PATENT DOCUMENTS 5,543,951 A    8/1996    Moehrmann 6,331,987 B1 *   12/2001   Beser ................ 370/486
6,334,219 B1     12/2001   Hill et al.
6,611,868 B1 *    8/2003   Arutyunov ........... 709/227
6,621,812 B1 *    9/2003   Chapman et al. ...... 370/346

FOREIGN PATENT DOCUMENTS

EP          0283 079 A2    9/1988
WO       WO 98/31115 A2    7/1998

OTHER PUBLICATIONS

V. Sdralia, C. Smythe, P. Tzerefos, S. Cvetkovic, Performance Characterisation of the MCNS DOCSIS 1.0 CATV Protocol with Prioritised First Come First Served Scheduling, XP-000851909, Jun. 1999, 5 sheets, vol. 45, No. 2, IEEE Transactions on Broadcasting.

(Continued)

*Primary Examiner*—Duc Ho
(74) *Attorney, Agent, or Firm*—Sterne, Kessler, Goldstein & Fox PLLC

(57) ABSTRACT

A method for synchronizing clocks in a packet transport network. The method comprises, receiving an external network clock at a central packet network node and transmitting timing information to a plurality of packet network devices, the timing information based upon the external network clock. The method further comprises, transmitting and receiving data that is synchronized to the timing information to a plurality of connected packet network devices. And finally, delivery of packets to an external interface via a packet network that contains data synchronized to the external network clock.

23 Claims, 3 Drawing Sheets

OTHER PUBLICATIONS

Cisco Cable Clock Card for the Ciscoubr7246 Vxr Universal Broadband Router, XP-002159663, Mar. 2000, pp. 1-22, retrieved from the Internet:<URL:http://cisco.com/univercd/cc/td/doc/product/cable/cab_r_sw/natlclck.pdf>.

Data Over Cable Interface Specifications, Cable Modem Termination System—Network Side Interface Specification, SP-CMTS NSII01-960702, Jul. 2, 1996, MCNS Holdings, L.P., Cable Labs, www.cablelabs.com.

Cisco UBR924 Cable Access Router Installation and Startup—Quick Start Guide, posted Jul. 19, 1999, Cisco Systems, www.cisco.com.

Christian Huitema, Jane Cameron, Peetros Mouchtaris, and Darek Smyk, An Architecture for Residential Internet Telephony Service, IEEE Network, May/Jun. 1999.

* cited by examiner

SYSTEM AND METHOD FOR THE SYNCHRONIZATION AND DISTRIBUTION OF TELEPHONY TIMING INFORMATION IN A CABLE MODEM NETWORK

CROSS-REFERENCE TO RELATED APPLICATIONS

This application is a continuation of U.S. patent application Ser. No. 09/656,459, filed on Sep. 6, 2000, now U.S. Pat. No. 6,819,682 which claims the benefit of U.S. Provisional Patent Application No. 60/152,254 filed Sep. 3, 1999, the contents of which are hereby incorporated by reference.

BACKGROUND OF THE INVENTION

Circuits for the distribution and synchronization of timing information play a key role in a number of applications which require a synchronous transfer of data, such as networks for transferring telephone calls over various networks, including the internet, and the like.

Current methods of signal synchronization between sub-networks do not provide complete synchronization. Incomplete synchronization results in data losses called slips. Compensating networks, including buffer circuitry, are typically used to compensate for slips caused by a lack of clock synchronization.

Those having skill in the art will understand the desirability of having a completely synchronous timing of sample collection and reconstruction that eliminates slips and the need for compensating circuitry. This type of network would provide complete synchronization of clocks between sub-networks by providing a series of clocks slaved to a master clock.

SUMMARY OF THE INVENTION

There is therefore provided in a present embodiment of the invention a method for synchronizing clocks in a packet transport network. The method comprises, receiving an external network clock at a central packet network node and transmitting timing information to a plurality of packet network devices, the timing information based upon the external network clock.

The method further comprises, transmitting and receiving data that is synchronized to the timing information to a plurality of connected packet network devices. And finally, delivery of packets to an external interface via a packet network that contains data synchronized to the external network clock.

Many of the attendant features of this invention will be more readily appreciated as the same becomes better understood by reference to the following detailed description considered in connection with the accompanying drawings.

DESCRIPTION OF THE DRAWINGS

These and other features and advantages of the present invention will be better understood from the following detailed description read in light of the accompanying drawings, wherein.

Like reference numerals are used to designate like parts in the accompanying drawings.

DETAILED DESCRIPTION OF THE INVENTION

Figure 1:
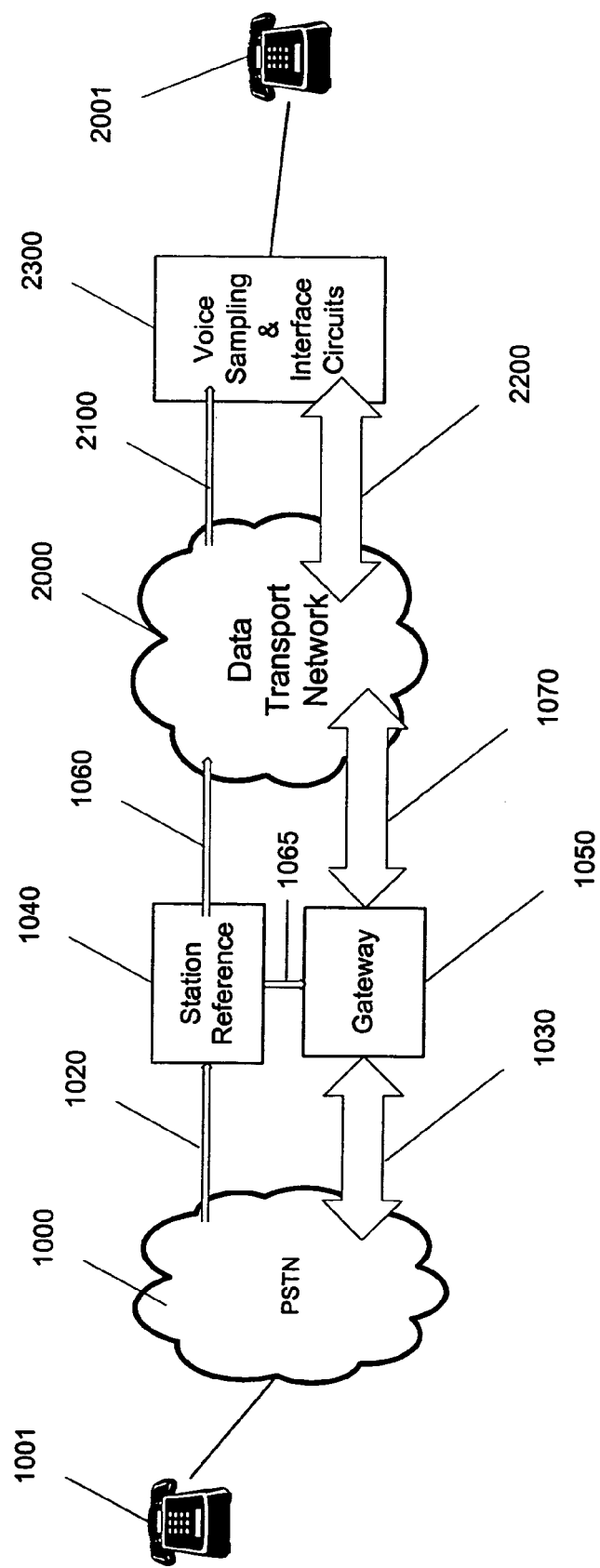
FIG. 1 is an illustration of a network system having synchronous clocking of digital telephony data between a Public Switched telephone network (PSTN) and an internet network via a gate way.

FIG. 1 is an illustration of a network system 0001 having synchronous clocking of voice telephony data between a telephone 1001 coupled to a conventional Public Switched Telephone Network (PSTN) 1000 and a telephone coupled a Digital Data Transport Network 2000. The telephone 1001 coupled to the PSTN uses conventional and ubiquitous interface methods typically used in virtually every home and business in North America today. The telephone 2001 coupled to the Digital Data Transport Network 2000 is capable of being coupled in any of a variety of methods in use today to include, but not limited to Voice over Internet Protocol (VoIP) or Voice over Digital Subscriber Loop (VoDSL).

For the purpose of this example, two telephones 1001 and 2001 are assumed to be identical. However, equivalent devices are available and interchangeable including ISDN phone or evolving Ethernet or VoIP phone instruments that provide equivalent functions. Those skilled in the art will recognize that the description of the interfaces and functions that follow are one of many equivalent configurations that are used to practice the described embodiment.

The interface between the telephone 1001 and the PSTN 1000 is a conventional loop start interface as described in the Telcordia document TR-NWT-000057. The interface between the PSTN 1000 and the Station Reference is a conventional Building Integrated Timing System 1020 (BITS) as described in Telcordia TR-NWT-001244. The interface between the PSTN 1000 and the Gateway 1050 is a conventionalGR-303 interface 1030.

The interface 1065 between the Station reference 1040 and the Gateway 1050 is a BITS interface. The interface between the Station Reference 1040 and the Data Transport Network 2000 is also the BITS interface. The interface between the Gateway 1050 and the Data Transport Network 2000 is the well known IEEE 802.3 interface a.k.a. Ethernet. The interface between the Cable Modem 2300 and the Data Transport Network is the well known DOCSIS interface. The interface between the Cable Modem 2300 and the telephone 2001 is the loop start interface as described in TR-NWT-000057.

All of the interfaces used in the practice of this invention are standards based and well known to those skilled in the art. Traditional implementations of Gateway devices between the PSTN and Data Transport networks ignore the timing information provided by the PSTN. The consequence of this design practice is that it tends to introduce large delay and data loss to the voice signal at the gateway thereby compromising the quality of the voice signal.

The present embodiment of the invention provides a system and a method of delivering the PSTN timing information using data transport methods so that the sampling and playout of voice information at the Gateway 1050 and the Cable Modem 2300-2001 is performed synchronously.

The synchronous operation of the embodiments of the invention minimizes data loss and the total delay experienced by the voice data as it is transported through the Data Transport Network.

Figure 2:
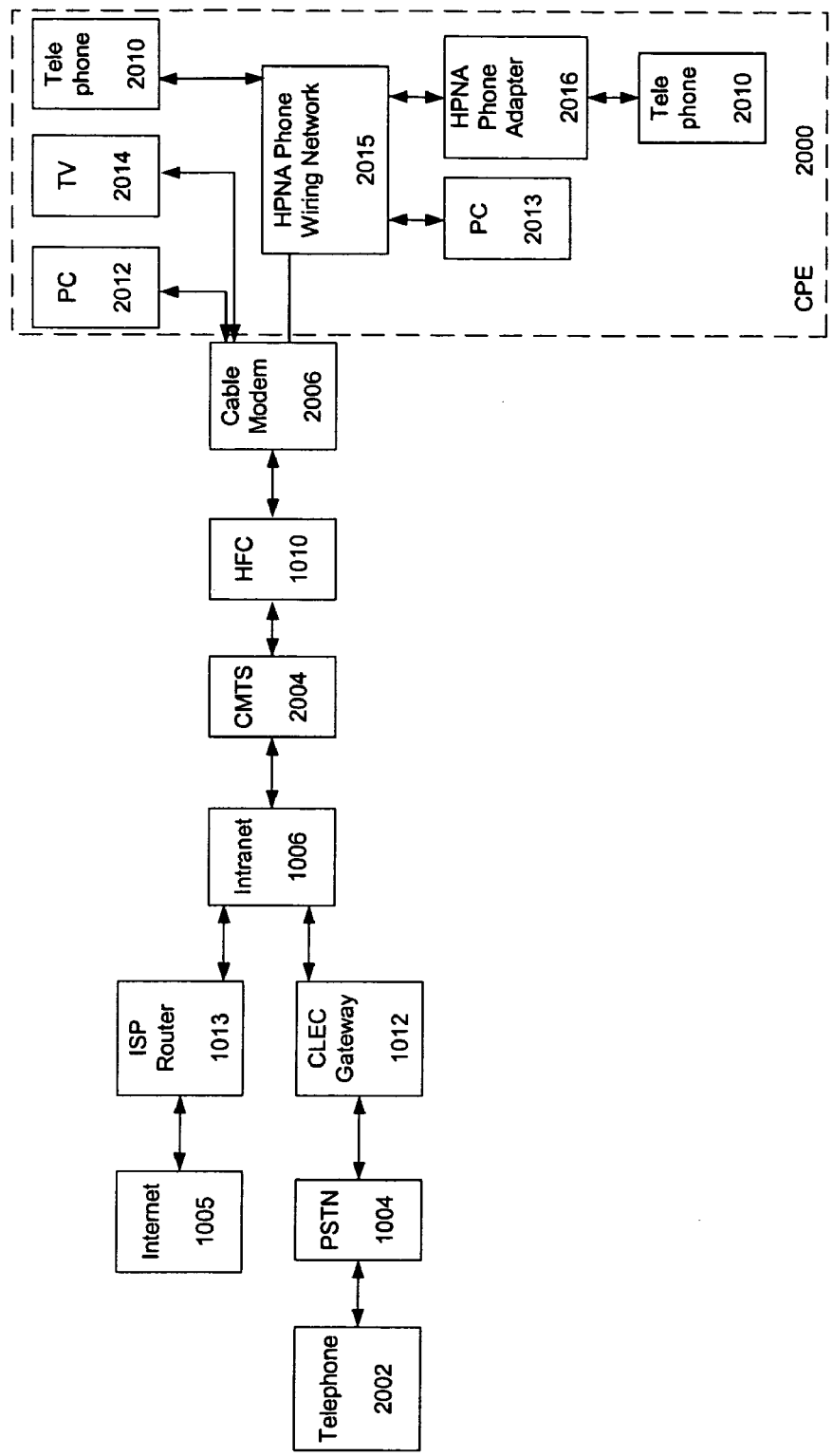
FIG. 2 is a block diagram of an internet telephone transmission system 1002 utilizing a cable television (CATV) network to couple one or more telephones that are in communications with each other.

FIG. 2 is a block diagram of an internet telephone transmission system 1002 utilizing a cable television (CATV) network 1026 to couple one or more telephones 2002, 2008, 2010 that are in communications with each other. The networks described in FIG. 2 are more fully described in Appendix 1 and Appendix 2.

In the embodiment shown a telephone 2002 is coupled to a PSTN 1004 in a conventional manner known to those skilled in the art. The PSTN 1004 is coupled to an Gateway 1012. Typically the PSTN to Gateway connection utilizes digital signal transmission as known to those skilled in the art. The gateway 1012 is coupled to an internet 1006 utilizing conventional signal transmission protocols known to those skilled in the art.

The internet 1006 is coupled to a CATV network 1026. The CATV network comprises a cable modem termination system (CMTS) 2004, a hybrid fiber coax (HFC) network 1010, and a cable modem 2006. The CMTS 2004 is coupled to the internet 1006 in a conventional manner known to those skilled in the art. The CMTS 2004 is coupled to the HFC 1010 in a conventional manner known to those skilled in the art. The HFC 1010 is coupled to the cable modem 2006 in a conventional manner known to those skilled in the art.

The cable modem 2006 is used as an access point to couple other networks, such as an HPNA network 2015, and other devices such as a PC 2012, and a telephone 2010 to the internet 1006. A PC 2012 is coupled to the cable modem 2006 in a conventional manner known to those skilled in the art. A television, or video system 2014 is coupled to the cable modem 2006 in a conventional manner known to those skilled in the art. A telephone 2010 is coupled to the cable modem 2006 in a conventional manner known to those skilled in the art.

The Cable modem 2006 is also coupled to an external network such as an HPNA network 1014 in a conventional manner known to those skilled in the art. The HPNA network shown comprises a HPNA phone adapter 2016. The cable modem 2006 is coupled to the HPNA Phone adapter 2016 in a conventional manner known to those skilled in the art. The HPNA phone adapter is coupled to a conventionally constructed telephone 2008 in a conventional manner known to those skilled in the art. The transmission system, utilizing the cable television network 1026, typically enables a home computer user to network their computer 2012 to the internet 1006 through a cable TV transmission network 1026 through a cable modem 2006. And also a user may make telephone calls through a cable modem 2006 as well as receive television broadcasts on a television set 2014.

The transmission of data over the cable television network 1026 is governed by the Data-Over-Cable Service Interface Specification (DOCSIS). In particular the DOCIS specification SP-RFI-I04-980724 is relevant to the implementation of the embodiments of the invention and is incorporated in its entirety by reference into the text of this application.

Transmission of digital telephony data between telephones 2008 in a home network, or equivalently a locally based network 1014, and over the cable television network 1026 to users not directly coupled to the home network 2002 is governed by a HPNA specification 2.0, incorporated herein in its entirety by reference. Thus, because of increasing use of network systems for telephone traffic, utilization of fully synchronous clocking is becoming more important as the demand to transmit voice over a data network increases.

Figure 3:
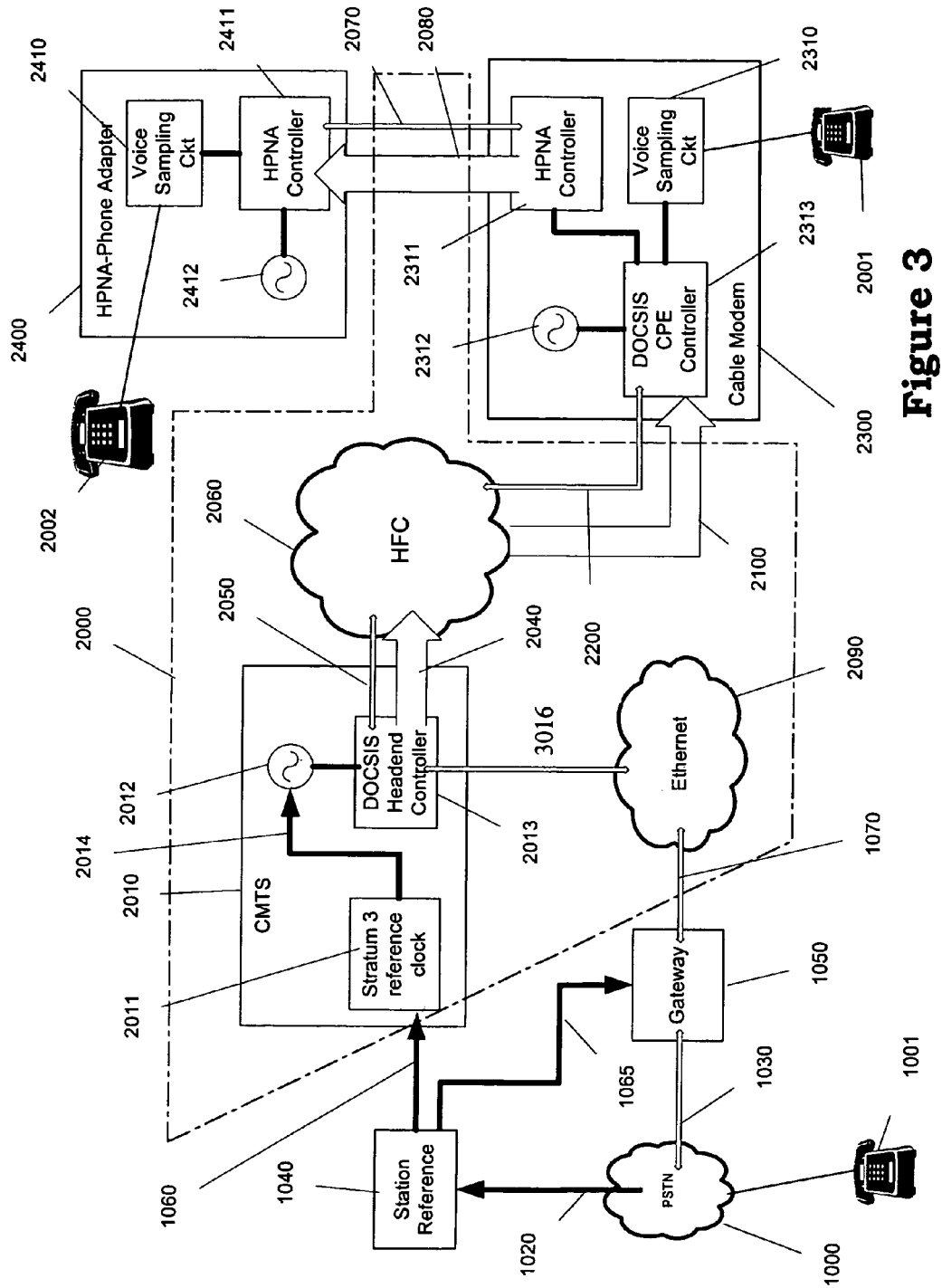
FIG. 3 is an illustration of an embodiment of a system for the synchronization and distribution of a fully synchronized clock signal.

FIG. 3 is an illustration of an embodiment of a system for the distribution of PSTN timing information signals using data transmission techniques. The collection of coupled networks 2060, 2070, 2080, 2090 forms an overall data transport network 2000 in which timing and voice data signals are transported between the PSTN 1000 and Voice Sampling circuits 2310 and 2410 coupled by the Data Transport Network 2000.

The CMTS 2010 is configured to allow the DOCSIS network clock 2012 to be synchronized to the station reference 1040 by using a well known Stratum 3 reference clock 2011. The performance of the Stratum 3 reference clock is defined by Telcordia TR-NWT-001244. Those skilled in the art will recognize that the synchronization interface 2014 between the Stratum 3 reference and the CMTS master oscillator 2012 is a conventionally constructed Phase Lock Loop (PLL) circuit, as known to those skilled in the art. In the embodiment shown, a CMTS 2010 comprises a Stratum 3 reference clock 2011 coupled 2014 to a CMTS master oscillator 2012 using a PLL circuit. The CMTS master oscillator 2012 is coupled to a DOCSIS head end controller 2013. The DOCSIS head end controller is conventionally constructed as is known to those skilled in the art. An example of this device is the commercially available BCM3210 from Broadcom Corporation. The DOCSIS head end controller 2013 couples an HFC 2060 via an upstream and downstream path 2050, to a QoS managed Ethernet 2090. The CMTS performs a media conversion operation between the DOCSIS RF network and the Ethernet. This operation is described by SP-RFI-I04-980724. The station reference 1040 and the Stratum 3 reference clock 2011 are conventionally constructed as is known to those skilled in the art.

The Hybrid Fiber Coax (HFC) network 2060 is conventionally constructed as is known to those skilled in the art. The HFC 2060 network provides physical transmission between the CMTS 2010 and a cable modem 2300. The DOCSIS data transmission method 2050 & 2200 provides a way to deliver Internet Protocol formatted packets imbedded in MPEG frames. A description of this method is described in SP-RFI-I04-980724. DOCSIS also identifies a method to transmit the CMTS timing master information 2012, using a DOCSIS specific method, to the Cable Modem 2300. The transmission of the clock information 2040 & 2100 permits the Cable Modem to generate a Timing Recovered Clock (TRC) 2312 that is frequency locked to the CMTS Master clock 2012. This embodiment causes the DOCSIS TRC clock 2312 to be frequency locked to the Station Reference 1040.

The cable modem 2300 comprises a DOCSIS CPE controller coupled to a voice sampling circuit 2310 that is in turn coupled to a conventionally constructed external telephone set 2001. The cable modem is conventionally constructed as is known to those skilled in the art. The Cable Modem TRC 2312 is coupled to the Voice Sampling circuit by conventional methods including clock dividers, as needed to match the rate of the TRC to that required by the Voice Sampling Circuit 2310. An example of the DOCSIS CPE Controller is the BCM3352 from Broadcom Corporation.

The HPNA controller is coupled to the TRC clock by the DOCSIS CPE controller. The HPNA controller provides a method to transmit the TRC timing information using HPNA protocol signals. This circuit is provided as an example to demonstrate that this timing transmission method may be used to further extend the timing network beyond the Cable Modem.

The HPNA controller 2311 of the cable modem serves to couple the HPNA network 2070 to the Ethernet 2090 using the data transport methods provided by the DOCSIS network. The HPNA controller and HPNA network are conventionally constructed as is known to those skilled in the art. The HPNA controller 2311 of the cable modem is coupled 2070 to an HPNA controller 2411 included in an HPNA phone adapter 2400. The HPNA controller 2311 provides a method to transmit the TRC clock 2312 to the HPNA Phone adapter clock 2412 over a messaging interface 2070. The HPNA controller 2411 is coupled to a local clock 2412, and a voice sampling circuit 2410. The voice sampling circuit 2410 is in turn coupled to a conventionally constructed external telephone set 2002.

The PSTN 1000 is conventionally constructed as is known to those skilled in the art. Gateway 1050 is also coupled to the Ethernet 2090, and the PSTN 1000. The PSTN is in turn coupled to a plurality of conventionally constructed telephone sets represented by a single phone 1001.

A cable modem termination system (CMTS) reference 2010 is synchronized to the network station reference 1040. The Station reference 1040 is used to synchronize the internal Stratum 3 reference clock 2011, contained in both the CMTS 2010 and the PSTN Gateway 1050. The Stratum 3 reference clock in the PSTN Gateway 1050 is conventionally constructed as is known to those skilled in the art. The DOCSIS CMTS reference 2012 is slaved to the Stratum 3 reference clock by a Phase Locked Loop (PLL) circuit 2014.

The DOCSIS CMTS reference 2012 that is synchronized to the PSTN station reference 1040 is transported over the HFC network 2060 to the DOCSIS CPE controller 2313 located in a remote cable modem 2300 using a DOCSIS SYNC method well known to those skilled in the art. The DOCSIS SYNC method causes the DOCSIS CPE controller's clock 2312, to be frequency locked to the CMTS reference clock 2012 which is in turn phase locked to the station reference 1040, which is phase locked to the PSTN clock as provided by the PSTN Clock distribution network. The end result of this connection method is that the DOCSIS CPE Controller's clock 2312, is frequency locked to the PSTN timing distribution network as reflected in the station reference 1040.

At the cable modem 2300, the DOCSIS CPE Controller's Clock 2312, is used to provide timing to voice circuit 2310 that is a part of the cable modem 2300 (or equivalently, are locally coupled to the DOCSIS CPE controller 2313). The DOCSIS CPE Controller's Clock 2312, is also used to provide timing for remotely coupled voice circuits 2411 coupled to an in home network 2080. The present invention connects these remote voice circuits via a conventional Home PNA network. Those skilled in the art will recognize that this connection may be equivalently accomplished by other network means including conventional Ethernet and Token Ring networks. The network connection is not limited to wired methods, as wireless networks provide an equivalent connection under the operation of various standards including the BlueTooth, IEEE 802.11a/b or HomeRF.

The HPNA Controller 2311 typically contained within the Cable Modem 2300 transmits a synchronized DOCSIS CPE Controller clock 2312, to the coupled HPNA phone adapter 2400. The HPNA Phone Adapter 2411 includes a similar HPNA controller 2411 for extracting clock information transmitted utilizing conventional transmission protocols by the cable modem's HPNA controller 2311. Transmission is accomplished via clock transmission MAC messages link 2080. The HPNA Phone Adapter uses the clock information to frequency lock the HPNA Phone adapter internal clock 2412 to the DOCSIS CPE controller clock 2312.

Thus the timing distribution method causes the voice sampling circuit clock 2412 within the HPNA phone adapter to be frequency locked to the DOCSIS CPE controller clock 2312. Also, the voice sampling circuits 2310 within the Cable Modem 2300 are phase locked to the DOCSIS CPE controller clock 2312. Thus, both voice sampling circuits 2311, 2411 are frequency synchronized to the station reference 1040. The voice-sampling circuits in the cable modem 2300 and the HPNA phone adapter 2400 are frequency synchronized to the PSTN Network timing via the station reference 1040.

The method includes utilization of a clock distribution system in which no metallic connection is needed to distribute the clocks to achieve synchronization. A metallic connection exists between station reference 1040 and stratum 3 reference clock 2011 via link 1060 and to the PSTN gateway 1050 via link 1065. The metallic connections are well known and described in the previously mentioned TR-NWT-001244 specification.

Other than the previously mentioned metallic connections, the system distributes 2040, 2100, 2080 timing based upon timing messages that include clock information.

The PSTN Gateway 1050 performs a media conversion function where packet based voice data is received on a first interface form the Ethernet 2090 and converts the samples to a conventional PSTN sample based interface. Those skilled in the art will recognize that the PSTN interface can equivalently be any of a large variety of interface types. In the present embodiment, this interface is assumed to be a conventional T1 interface as described by Telcordia specification GR-303.

The T1 interface is a digital interface where samples are transmitted synchronously over a serial multiplexed interface. The PSTN gateway 1050 collects constant size sets of samples and constructs transmission packets that are transmitted via the available data transmission network to the connected target circuits. In this embodiment the target circuits are the Voice circuit 2310 contained in the Cable Modem 2300 or the HPNA Phone Adapter 2400. The present embodiment uses DOCSIS to transmit data over a Hybrid Fiber Coax (HFC) network 2060 and an Ethernet network 2090 to perform data packet delivery. Those skilled in the art will recognize that these are simple examples of data transmission networks and that equivalently a large number of alternative network transmission systems are well known in this art to accomplish the same connections.

The Customer Premise Equipment (CPE) Voice sampling circuits receive the data packets containing the constant size set of voice samples and play these sample out to an audio interface to the connected telephone device 2001 using the frequency locked local version of the DOCSIS CPE controller clock 2312. This clock is frequency locked to the PSTN timing distribution clock via the Station reference 1040. Thus, these samples will play out at the same rate at the voice sampling circuit 2310, 2410 at the same rate that they are arriving at the PSTN gateway 1050. Hence the entire operation is free of data over run or under run impairments that tend to have an adverse affect on the voice quality that would tend to occur if this timing distribution method were not used.

Distribution is a DOCSIS transmission system accomplished by the following method. A conventional DOCSIS transmission system includes a DOCSIS head-end controller 2010, including CMTS master clock 2012. An HFC network 2060 is coupled to the DOCSIS head-in controller 2013 by messaging path 2050, 2040. The HFC network 2060 is coupled by messaging path 2040, 2050 to a DOCSIS CPE controller 2313. The DOCSIS CPE controller 2313 includes a local clock 2312. The local clock 2312 is synchronized to clock 2012 by a conventional internally generated DOCSIS clock sync method 2040. Clocks 2312 and 2012 are thus synchronized by a conventional DOCSIS mechanism. In the embodiment described in the DOCSIS system, clock 2012 is the master reference and establishes the time base for the entire DOCSIS network.

A conventionally formatted DOCSIS message includes a message called a SYNC message that transmits clock rate information concerning clock 2012 so that the controller 2313 contained in the cable modem 2300 uses that information to synchronize clock 2312 to clock 2012. This is the DOCSIS clock transport mechanism.

An embodiment of the invention utilizes the DOCSIS clock transport. The DOCSIS clock transport mechanism is designed solely to transmit a clock signal downstream. In an exemplary embodiment, the DOCSIS clock transport mechanism is used to transport the PSTN synchronization information to systems local to the cable modem that require synchronization to the PSTN.

The embodiment of the invention utilizes a stratum 3 reference clock 2011 to import a master clock. The stratum 3 reference clock 2011 synchronizes itself to the station reference clock 1040. A synchronization signal 2014 synchronizes the CMTS clock 2012 to the stratum reference clock 2011. The stratum 3 reference clock is conventionally constructed as outlined in Telcordia standard TR-NWT-001244, the contents of which are incorporated in their entirety into this application by reference. Synchronization of a station reference 1040 to a Stratum reference clock 1060 is achieved by conventional synchronization circuitry known to those skilled in the art. Thus connected, the stratum 3 reference clock 2011 is now the CMTS 2010 master reference.

In the embodiment shown, the DOCSIS master reference 2012 is slaved to the station reference 1040 through the stratum 3 reference clock 2011. When the DOCSIS system is operating, it transmits clock 2012 to clock 2312 using SYNC messages. However, what the DOCSIS system is actually doing is transmitting the station reference 1040, since clock 2012 is slaved to clock 1040 which is in turn slaved to the station reference 1040. It is desirable to slave the DOCSIS timing to the station reference 1040 that is also utilized by the PSTN network, since telephone equipment 2001, 2002 that is controlled by the cable modem sources and sinks data from the PSTN gateway 1050 which is also synchronized to the PSTN timing by the same station reference 1040.

The gateway converts packets arriving from the HFC 2060. The gateway 1050 converts packets arriving from the HFC via the Internet into a PSTN compatible signal. The PSTN network provides synchronization to the station reference 1040. It is desirable to have packets of data arriving at the gateway 1050 to be timed in synchronization with the station reference 1040 to prevent slips.

The gateway 1050 is a system that performs protocol conversions between different types of networks and applications allowing signals to be transferred. For example a gateway converts messages between two differing protocols so that a message from a first network may be transported and processed in a second differing network. Processing control is passed from one layer to the next, starting at the application layer at a station, and proceeding to the bottom protocol layer, over a channel (such as the internet) to a next station and back up a layered hierarchy at that station. Alternatively a message may be simply passed through a network, once its protocol is converted by a gateway so that it may pass through the network to a different network where it will be processed.

Data arrives at the gateway 1050 via an upstream path that originates from one of several telephone sets 2002, 2001. The upstream data path for a HPNA phone to the PSTN starts with data path 2070 between the HPNA phone adapter and the cable modem 2300. The next link is from the cable modem to the HFC 2060 via link 2200. The next link is from the HFC to the CMTS 2010 via the upstream data path 2050. The CMTS links upstream data to the Internet via data path 3016. Finally, the Ethernet links the data to the gateway 1050 via data path 1070. At the gateway 1050, it is desirable to transfer the data to the PSTN 1000 without slips.

A slip free environment is alternatively termed a completely synchronous environment. By controlling a sample clock with external station reference 1040, the voice sampling circuit 2310, 2410, is completely synchronized to the station reference to provide a slip free conversion. Clock information is used to transmit and receive data. Clock information is also used to develop a sample clock to sample an audio interface at the gateway 1050. Audio samples are converted to data at the station reference rate of the PSTN. This synchronous sampling prevents slipping, simplifying circuitry recognition and tending to improve audio quality.

Slipping occurs when two clocks are not the same, such as the clock for the voice sampling circuit 2310 and the clock for the PSTN which is the station reference 1040. Often the clocks will be close but not the same. In a PSTN, network slip management is utilized. For example, if the voice sampling clock were to be running slightly faster than the station reference clock 1040, then over time the voice sampling circuit 11 would be collecting more samples than the PSTN synchronized to the station reference 1040. Thus, more samples than are capable of being transmitted to the PSTN network are collected. This occurs because the gateway clock 1050 is not fully synchronized to the station reference 1040. A buffer circuit associated with the voice sampling circuit 2310 typically stores the samples. However, if the voice sampling circuit is sampling at a faster rate than the gateway, can clock the data into the PSTN, then a buffer circuit associated with the sampling circuit 2310 will fill up over time and samples will be discarded because they are more than can be processed. To prevent this problem, a slip buffer is typically utilized. In the slip buffer after a certain amount of time samples are discarded. After some of the information has been discarded, the buffer continues to fill up with data samples until a certain percentage of capacity has been reached when samples are again discarded.

In the case where the sampling clock of the voice sampling circuit 2310 is running slower than the station reference 1040 that is driving the synchronization circuitry in the gateway 1050, then the PSTN is accepting more data than the voice sampling circuit 2310 is capable of providing. To deal with this problem, the information is periodically repeated to maintain synchronization with the transmitter. The two techniques just outlined are often termed "slip buffer management". Thus, if the sampling clock 2310 is operating synchronously with the station reference 1040 that is clocking the gateway 1050, data will never slip. Data samples will be collected by the PSTN at exactly the same rate that they are being sent to the PSTN by the internet.

The timing synchronization in the downstream path is accomplished in the same way. Messages sent from the PSTN through the gateway 1050 are sampled with a clock set by the station reference 1040. The station reference is synchronized to a voice sampling circuit 2310 through the stratum 3 reference clock 2011 and the DOCSIS head-in controller through a message sent over the HFC to the DOCSIS CPE controller. This approach to synchronization of clocks in a packet transport network allows management of slippage and the associated circuitry necessary to implement that slip management to be eliminated.

The invention claimed is:

1. A communications system, comprising:
   a cable modem termination system coupled to a communication network;
   a clock external to the cable modem termination system being synchronized to a public switched network; and
   a cable modem coupled to the cable modem termination system and synchronized to the cable modem termination system;
   wherein the clock is coupled to the cable modem termination system.

2. The communications system of claim 1 further comprising a telephone coupled to the cable modem.

3. The communications system of claim 1, wherein the communication network is a packet transport network.

4. The communications system of claim 3 wherein the packet transport network comprises an in-home twisted pair telephone line.

5. The communications system of claim 4 wherein the packet transport network further comprises a telephone coupled to the in-home twisted pair telephone line.

6. The communications system of claim 1 wherein the communication network comprises an Ethernet.

7. The communications system of claim 1 wherein the external clock comprises a station reference.

8. The communications system of claim 7 wherein the cable modem termination system further comprises a local reference clock synchronized to the station reference, the cable modem termination system being synchronized to the local reference clock.

9. The communications system of claim 8 wherein the local reference clock comprises a Stratum 3 reference clock.

10. The communications system of claim 9 further comprises a second communication network coupled to the cable modem.

11. The communications system of claim 10 wherein the second communication network comprises an in-home twisted pair telephone line.

12. The communications system of claim 11 wherein the second communication network is synchronized to the cable modem.

13. A communications system comprising:
    a cable modem termination system synchronized to an external clock;
    a public switched network synchronized to the external clock; and
    a device coupled to an in-home twisted pair telephone line and synchronized to the cable modem termination system.

14. The communications system of claim 13 wherein the external clock comprises a station reference for a public switched telephone network.

15. The communications system of claim 14 wherein the cable modem termination system further comprises a local reference clock synchronized to the station reference, the cable modem termination system being synchronized to the local reference clock.

16. The communications system of claim 15 wherein the local reference clock comprises a Stratum 3 reference clock.

17. The communications system of claim 13 further comprising a cable modem coupled to the cable modem termination system and synchronized to the cable modem termination system.

18. The communications system of claim 13 further comprising a gateway between the public switched telephone network and the cable modem termination system, the gateway being synchronized to the external clock.

19. A method of data communication, the method comprising:
    synchronizing a cable modem termination system to a clock external to the cable modem termination system;
    synchronizing a public switched network to the external clock; and
    exchanging data and voice between the cable modem termination system and the public switched network.

20. The method of claim 19 further comprising synchronizing a cable modem to the cable modem termination system.

21. The method of claim 19 further comprising synchronizing a packet transport network coupled to the cable modem termination system to the external clock.

22. The method of claim 21 further comprising exchanging data and voice between the cable modem and the packet transport network.

23. The method of claim 22 wherein the packet transport network comprises an in-home twisted pair telephone line.

* * * * *